(12) United States Patent
Wiemann et al.

(10) Patent No.: US 12,041,492 B2
(45) Date of Patent: Jul. 16, 2024

(54) WIRELESS DEVICE CAPABILITY FILTERS IN WIRELESS COMMUNICATION NETWORKS

(71) Applicant: Telefonaktiebolaget LM Ericsson (publ), Stockholm (SE)

(72) Inventors: Henning Wiemann, Aachen (DE); Lian Araujo, Solna (SE); Ylva Timner, Luleå (SE); Paul Schliwa-Bertling, Ljungsbro (SE); Malik Wahaj Arshad, Upplands Väsby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 338 days.

(21) Appl. No.: 17/426,000

(22) PCT Filed: Feb. 13, 2020

(86) PCT No.: PCT/IB2020/051201
§ 371 (c)(1),
(2) Date: Jul. 27, 2021

(87) PCT Pub. No.: WO2020/165831
PCT Pub. Date: Aug. 20, 2020

(65) Prior Publication Data
US 2022/0053386 A1    Feb. 17, 2022

Related U.S. Application Data

(60) Provisional application No. 62/805,944, filed on Feb. 14, 2019.

(51) Int. Cl.
H04W 36/00    (2009.01)
H04W 8/22     (2009.01)

(52) U.S. Cl.
CPC ......... H04W 36/0055 (2013.01); H04W 8/22 (2013.01)

(58) Field of Classification Search
CPC ............... H04W 36/0055; H04W 8/22; H04W 36/0083; H04W 36/26; H04W 48/16; H04W 36/00; H04W 48/00; H04W 28/02
See application file for complete search history.

(56) References Cited

U.S. PATENT DOCUMENTS

| 2018/0124650 | A1* | 5/2018 | Park | H04W 36/0016 |
| 2019/0150096 | A1* | 5/2019 | Lee | H04W 52/40 370/331 |
| 2020/0314913 | A1* | 10/2020 | Rastegardoost | H04L 5/0091 |

FOREIGN PATENT DOCUMENTS

WO    2015138079 A1    9/2015

OTHER PUBLICATIONS

3GPP, NPL document, "Technical Specification Group Services and System Aspects; Study on optimizations of UE radio capability signaling (Release 16)" (Year: 2019).*

(Continued)

*Primary Examiner* — Mewale A Ambaye
(74) *Attorney, Agent, or Firm* — Weisberg I.P. Law, P.A.

(57) ABSTRACT

Methods in a radio network node are provided in which the radio network node receives, from a network node, first wireless device capability information associated with a wireless device, determines second wireless device capability information required by the radio network node, and sends, to the wireless device, a request for capability information. The request for capability information includes a capability filter based, at least in part, on the first wireless device capability information and on the second wireless device capability information. Related radio network nodes and computer program products are also provided.

21 Claims, 13 Drawing Sheets

(56) References Cited

OTHER PUBLICATIONS

Aspects on filtered capability enquiries with SA2 capability ID solutions (Year: 2019).*
"Consideration on filtering of UE radio capabilities" (Year: 2019).*
International Search Report and Written Opinion dated May 15, 2020 for International Application No. PCT/IB2020/051201 filed Feb. 13, 2020, consisting of 14-pages.
3GPP TSG-RAN WG2 #105 Tdoc R2-1900646; Title: Aspects on filtered capability enquiries with SA2 Capability ID solutions; Agenda Item: 11.5.2; Source: Ericsson; Document for: Discussion, Decision; Date and Location: Feb. 25-Mar. 1, 2019, Athens, Greece, consisting of 10-pages.
3GPP TSG-RAN WG2 Meeting #105 R2-1900827; Title: Consideration on filtering of UE radio capabilities; Agenda Item: 11.5.2; Source: ZTE Corporation, Sanechips; Document for: Discussion and Decision; Date and Location: Feb. 25-Mar. 1, 2019, Athens, Greece, consisting of 4-pages.
3GPP TR 23.743 V1.1.0; 3rd Generation Partnership Project; Technical Specification Group Services and System Aspects; Study on optimisations of UE radio capability signalling (Release 16), Jan. 2019, consisting of 55-pages.
3GPP TS 23.501 V15.4.0; 3rd Generation Partnership Project; Technical Specification Group Services and System Aspects; System Architecture for the 5G System; Stage 2 (Release 15), Dec. 2018, consisting of 236-pages.
3GPP TS 23.502 V15.4.1; 3rd Generation Partnership Project; Technical Specification Group Services and System Aspects; Procedures for the 5G System; Stage 2 (Release 15), Jan. 2019, consisting of 347-pages.
3GPP TS 38.300 V15.4.0; 3rd Generation Partnership Project; Technical Specification Group Radio Access Network; NR; NR and NG-RAN Overall Description; Stage 2 (Release 15), Dec. 2018, consisting of 97-pages.
3GPP TS 38.331 V15.4.0; 3rd Generation Partnership Project; Technical Specification Group Radio Access Network; NR; Radio Resource Control (RRC) protocol specification (Release 15), Dec. 2018, consisting of 474-pages.
3GPP TS 38.413 V15.2.0; 3rd Generation Partnership Project; Technical Specification Group Radio Access Network; NG-RAN; NG Application protocol (NGAP) (Release 15), Dec. 2018, consisting of 308-pages.
3GPP TS 38.423 V15.2.0; 3rd Generation Partnership Project; Technical Specification Group Radio Access Network; NG-RAN; Xn application protocol (XnAP) (Release 15), Dec. 2018, consisting of 281-pages.

* cited by examiner

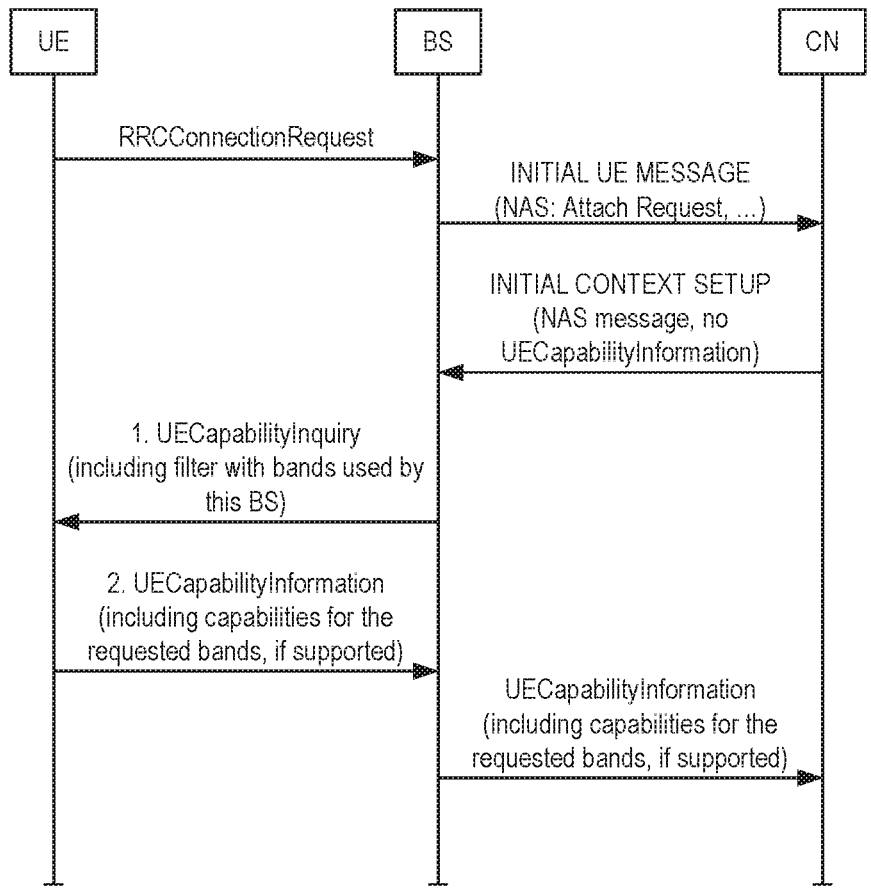
Fig. 1 – UE Capability Transfer Upon RRC Connection Request

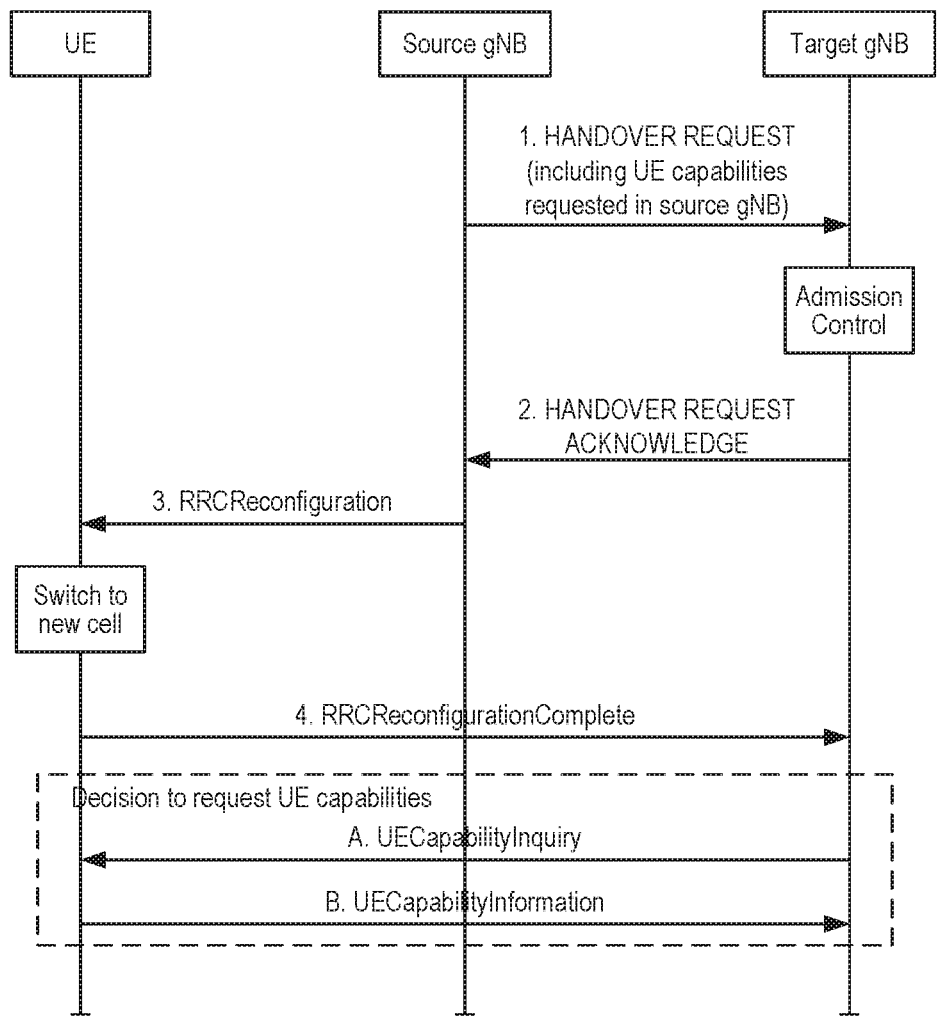
Fig. 2 – UE Capability Transfer Upon Handover

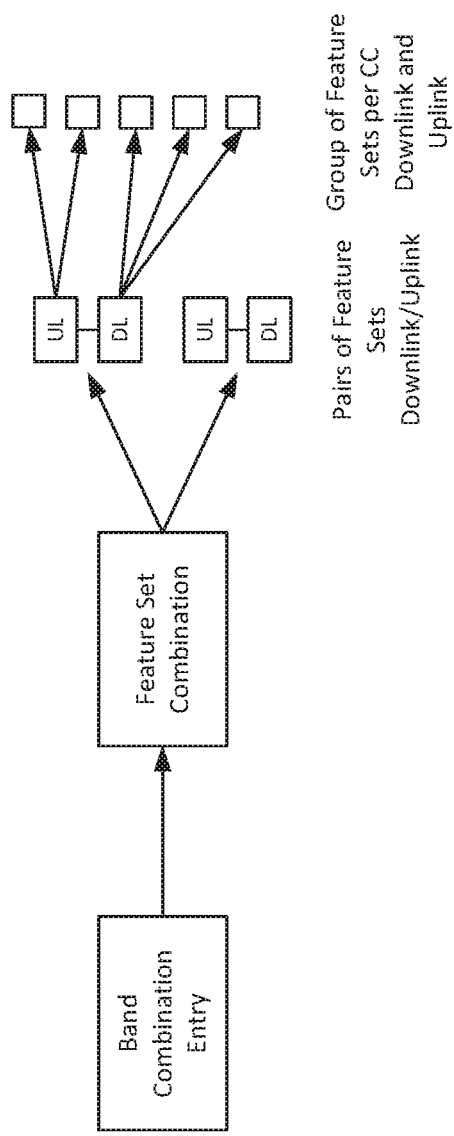
Fig. 3 – General Feature Set Structure for a Band Combination Entry

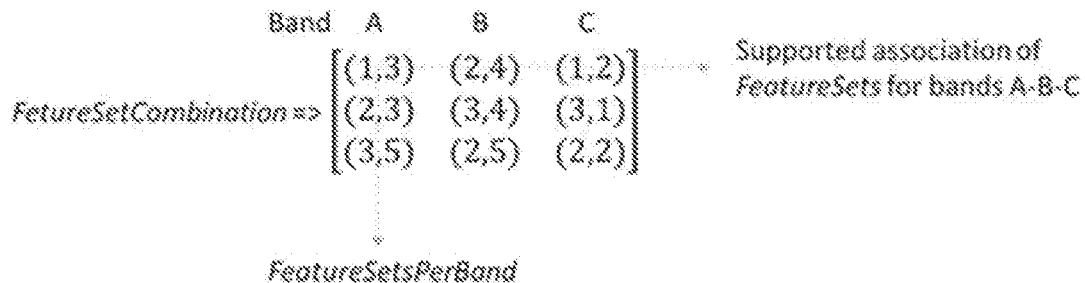
Fig. 4 – Feature Set Combination Structure
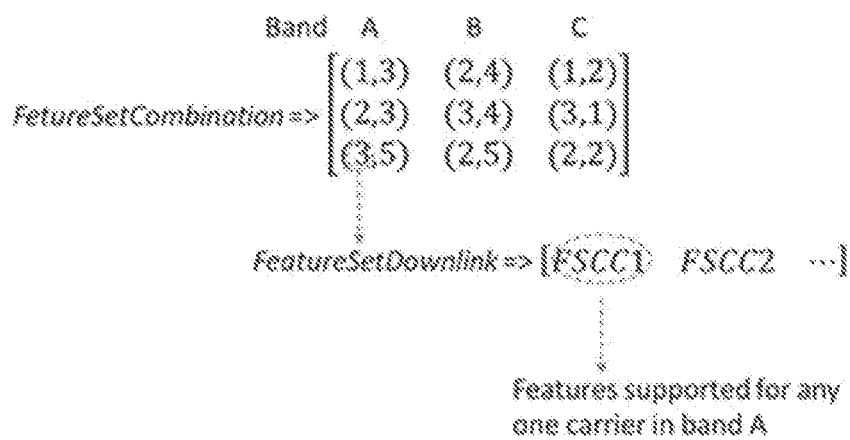
Fig. 5 – Feature Set Downlink Structure (Similar Structure Is Adopted for Uplink)

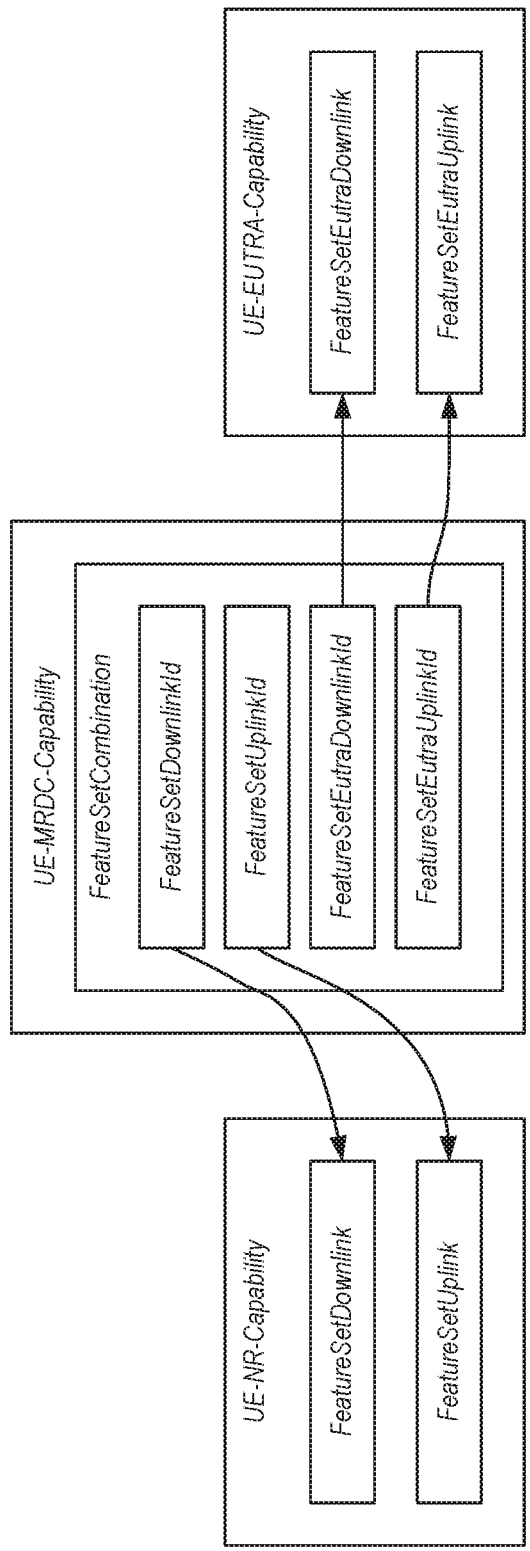
Fig. 6 – Feature Set Dependencies for MR-DC Cases

WIRELESS DEVICE CAPABILITY FILTERS IN WIRELESS COMMUNICATION NETWORKS

CROSS-REFERENCE TO RELATED APPLICATIONS

This application is a Submission Under 35 U.S.C. § 371 for U.S. National Stage Patent Application of International Application No.: PCT/IB2020/051201, filed Feb. 13, 2020 entitled "WIRELESS DEVICE CAPABILITY FILTERS IN WIRELESS COMMUNICATION NETWORKS," which claims priority to U.S. Provisional Application No. 62/805,944, filed Feb. 14, 2019, entitled "WIRELESS DEVICE CAPABILITY FILTERS IN WIRELESS COMMUNICATION NETWORKS," the entireties of both of which are incorporated herein by reference.

TECHNICAL FIELD

The present description generally relates to wireless communications and wireless communication networks, and more particularly relates to capability filters in wireless communication networks.

BACKGROUND

Overview of Capability Transfer

In New Radio (NR), the gNB (i.e., an NR base station) obtains the User Equipment (UE) capabilities for a connecting UE from the Access and Mobility Management Function (AMF). If the AMF has not stored the capabilities for the UE (e.g. upon ATTACH), the gNB fetches them from the UE.

Upon initial attach, the AMF does not yet know the UE capabilities and will hence not provide them in the "Initial Context Setup" message. Thus, the gNB has to acquire the required UE capabilities from the UE, and forward the received UE capabilities to the AMF. This is depicted in FIG. 1.

Upon handover, a source gNB transmits UE capabilities previously acquired to the target gNB, which may avoid the need for the target gNB to request UE capabilities again. However, the target gNB can also decide to again request UE capabilities (e.g. in case the support of a specific feature of interest to the gNB was not reported in the UE capabilities received from the source gNB). This is depicted in FIG. 2.

UE Capability Structure for Band Combinations

The advertising of band combinations in the UE capabilities accounts for most of the capability size reported in the UECapabilityInformation message. Hence, this section details the signaling used in UE capabilities for band combinations, with a focus on the optimizations adopted to reduce the signaling size. The optimizations, described below, aim to reduce the redundancy among features reported in band combinations. This is achieved by referring to identifiers or IDs, which point to a group of features (feature sets) that may be reused among band combinations.

Each band combination refers to one FeatureSetCombinationId which identifies a Feature Set Combination. This is motivated by the fact that multiple band combinations may have the same Feature Set Combination, and thus can use an ID to refer to a sole Feature Set Combination.

In turn, a Feature Set Combination refers to multiple pairs of IDs, the pairs of IDs refer to Feature Set Downlink and Feature Set Uplink. Each Feature Set (Downlink/Uplink) refers to multiple Feature Sets per CC (Downlink/Uplink) (ID) (see FIG. 3).

Therefore, three different levels of IDs are adopted in a band combination entry, with each level representing features that can be reused in other band combinations, by referring to the same ID.

A Feature Set Combination (FeatureSetCombination IE) can be seen as a matrix of Feature Sets Downlink/Uplink. As an example, for a band combination comprising bands A, B, C, each element represents a pair of (FeatureSetDownlinkId/FeatureSetUplinkId). UE supports Feature Sets Downlink/Uplink advertised in the same position across bands in the band combination (in the same row, see FIG. 4).

Each FeatureSetDownlinkId points to one FeatureSetDownlink, in turn a FeatureSetDownlink refers to a FeatureSetDowlinkperCC-Id (FSCC in the example). The number of FSCC's is equal to the number of carriers supported for that band. Unlike other feature sets, the order of FSCC does not matter. Thus, the network may configure any of the carriers in accordance with any of the given FSCCs (see FIG. 5).

While reporting UE capabilities for EN-DC, NE-DC and NGEN-DC, those are included in a UE-MRDC-Capability container. This MR-DC capability container has no FeatureSetDownlink(Uplink) IEs, but refers in its Feature Set Combination to Feature Sets Downlink/Uplink used in NR and E-UTRA capabilities. This implies that consistency should be applied among NR, MR-DC and E-UTRA capabilities concerning Feature Set IDs (see FIG. 6).

Principles of Capability Transfer

Therefore, to achieve consistency, when the network requests NR, MR-DC or E-UTRA capabilities, it should apply the same filter for all the requests.

As an example, the network may:

Request capabilities for E-UTRA, with a filter for E-UTRA bands A, B, and C and NR bands D and E;

Then request capabilities for NR, with the same filter;

Finally request capabilities for EN-DC, with the same filter.

By using the same filter in all the requests, it is guaranteed that the reported Feature Set IDs referred in MR-DC capability container are properly referred in NR/EUTRA capabilities.

SUMMARY

As discussed above, a base station (or more generally a radio network node) typically performs a capability request including a filter for the operating bands in the base station.

When receiving, from the core network, UE radio access capabilities referring to certain bands (previously requested), a base station may need to know additional UE capabilities, corresponding to other bands. In this case, an additional capability request must be performed, demanding additional use of radio resources and parsing of capabilities. In turn, the necessity to perform additional capability requests, including a filter for different bands, can continuously overwrite the UE radio access capabilities stored in the core network.

When performing handover, a source base station may not have requested capabilities corresponding to all the bands desired by the target base station. This implies that the target base station, when receiving UE capabilities retrieved in the source base station, cannot configure the UE with certain desired bands, and must perform an additional capability request, also demanding additional use of radio resources and parsing of capabilities.

Hence, it is proposed that a serving base station, when performing a request of UE radio access capabilities filtered by certain bands, includes in the requested bands more bands than those to be used by the serving base station. The bands included in this request may cover e.g., the operating bands of a Public Land Mobile Network (PLMN), or operating bands of a group of neighbor base stations, i.e. taking the neighboring relations into consideration. The exact set of bands to be requested may vary e.g., with Operations, Administration and Management (OAM) applied to the network.

According to one aspect, some embodiments include a method performed by a radio network node. The method generally comprises receiving, from a network node, first wireless device capability information associated with a wireless device, determining second wireless device capability information required by the radio network node, and sending, to the wireless device, a request for capability information, wherein the request for capability information comprises a capability filter based, at least in part, on the first wireless device capability information and on the second wireless device capability information.

The capability filter may be based on a union of the first wireless device capability information and the second wireless device capability information.

The first wireless device capability information may comprise capability information related to, or associated with, a first set of parameters, the second wireless device capability information may comprise capability information related to, or associated with, a second set of parameters, and the capability filter may be based, at least in part, on the first set of parameters and on the second set of parameters. The first set of parameters may comprise a first set of frequency bands, and the second set of parameters may comprise a second set of frequency bands. The capability filter may be based on a union of the first set of parameters and of the second set of parameters.

The method may further comprise receiving, from the wireless device, third wireless device capability information, wherein the third wireless device capability information comprise capability information related to the capability filter. The method may further comprise sending the third wireless device capability information to at least one of another radio network node and a core network node.

The method may comprise sending, to another wireless device, another request for capability information, wherein the other request for capability information comprises the capability filter based, at least in part, on the first wireless device capability information and on the second wireless device capability information.

According to another aspect, some embodiments include a radio network node adapted, configured, enabled, or otherwise operable, to perform one or more of the described radio network node functionalities (e.g. actions, operations, steps, etc.).

In some embodiments, the radio network node may comprise one or more transceivers, one or more communication interfaces, and processing circuitry operatively connected to the one or more transceivers and to the one or more communication interfaces. The one or more transceivers are configured to enable the radio network node to communicate with one or more wireless devices over a radio interface. The one or more communication interfaces are configured to enable the radio network node to communicate with one or more other radio network nodes (e.g., via a radio access network communication interface), with one or more core network nodes (e.g., via a core network communication interface), and/or with one or more other network nodes. The processing circuitry is configured to enable the radio network node to perform one or more of the described radio network node functionalities. In some embodiments, the processing circuitry may comprise at least one processor and at least one memory, the memory storing instructions which, upon being executed by the processor, configure the at least one processor to enable the radio network node to perform one or more of the described radio network node functionalities.

According to another aspect, some embodiments include a computer program product. The computer program product comprises computer-readable instructions stored in a non-transitory computer-readable storage medium of the computer program product. When the instructions are executed by processing circuitry (e.g., at least one processor) of the radio network node, they enable the radio network node to perform one or more of the described radio network node functionalities.

The proposed solution may avoid the need for additional capability requests, e.g., in handover scenarios where source and target base station have different operating bands. This may allow the target base station to be aware of UE capabilities in its operating bands without the need for additional capability requests, which may enable an early configuration of the UE with the given operating bands.

By avoiding additional requests of UE capabilities, constant overwrite of the UE radio access capabilities stored in the core network may be avoided. This is possible because a base station, when receiving from the core network UE radio access capabilities referring to a list of bands (previously requested), may have its operating bands contained in this list, which will free up the network from requesting and parsing capabilities for those bands.

This overview is not an extensive overview of all contemplated embodiments, and is not intended to identify key or critical aspects or features of any embodiments or to delineate any embodiments. Other aspects and features will become apparent to those ordinarily skilled in the art upon review of the following description of specific embodiments with the figures.

BRIEF DESCRIPTION OF THE DRAWINGS

Exemplary embodiments will be described in more detail referring to the following figures, in which:

FIG. 1 is a signaling and operating diagram of UE capability transfer upon RRC connection request.

FIG. 2 is a signaling and operating diagram of UE capability transfer upon handover.

FIG. 3 is a schematic diagram of the general feature set structure.

FIGS. 4 and 5 are schematic diagrams of examples of a Feature Set Combination Structure and of Feature Set Downlink Structure, respectively.

FIG. 6 is a block diagram of an example of a Feature Set Dependencies in an MR-DC case.

DETAILED DESCRIPTION

The embodiments set forth below represent information to enable those skilled in the art to practice the embodiments. Upon reading the following description, given the accompanying figures, those skilled in the art will understand the concepts of the description and will recognize applications of these concepts not addressed herein. These concepts and applications fall within the scope of the description.

In the following description, numerous specific details are set forth. However, it is understood that embodiments may be practiced without these specific details. In other instances, well-known circuits, structures, and techniques have not been shown in order not to obscure the understanding of the description. Those of ordinary skill in the art, with the included description, can implement appropriate functionality without undue experimentation.

Figure 7:
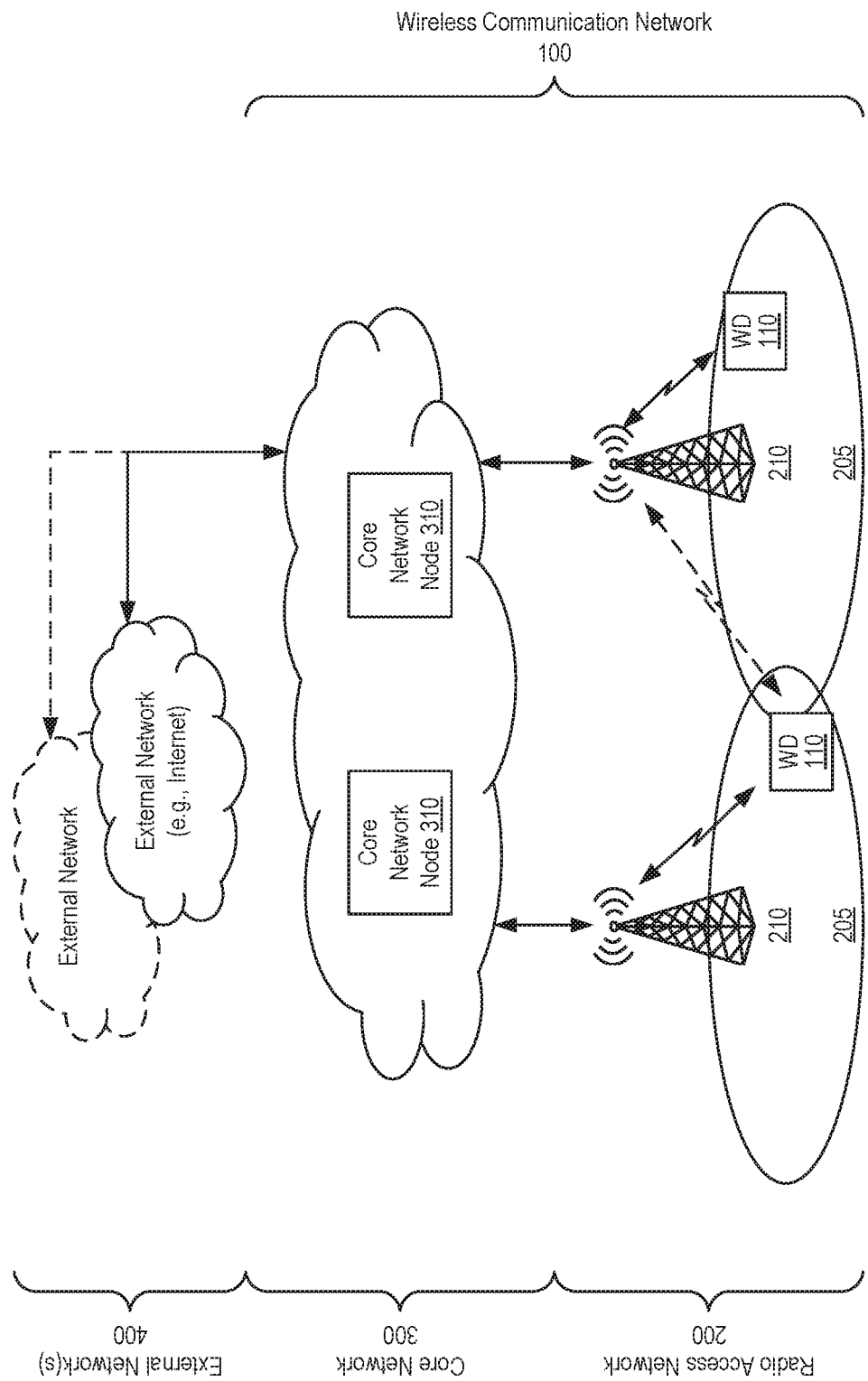
FIG. 7 is a schematic diagram of an example wireless communication network according to some embodiments.

Referring now to FIG. 7, an example of a wireless communication network 100 in which some embodiments may be deployed is depicted. The wireless communication network 100 generally enables wireless devices 110 to communicate with one or more external networks 400 via a radio access network 200 (also referred to as RAN) and a core network 300 (also referred to as CN).

The radio access network 200 generally comprises a plurality of radio network nodes 210 (only two are shown for clarity) which are responsible for providing radio access, over a radio interface, to wireless devices 110 (only two are shown for clarity) via one or more cells 205. Each cell 205 generally defines a geographical area associated to, and served by, a radio network node 210 where radio coverage is provided by the radio network node 210. Notably, one radio network node 210 may serve more than one cell 205, each of these cells possibly covering different geographical areas.

The core network 300, which connects the radio access network 200 to one or more external networks 400, generally comprises various core network nodes 310. Though generically referred to as core network nodes 310, these core network nodes 310 usually have different functions. For instance, some core network nodes 310 may be responsible for managing the connectivity of the wireless devices within the wireless communication network 100 while other core network nodes 310 may be responsible for handling the transmission of data between the wireless devices and the one or more external networks 400.

Figure 8:
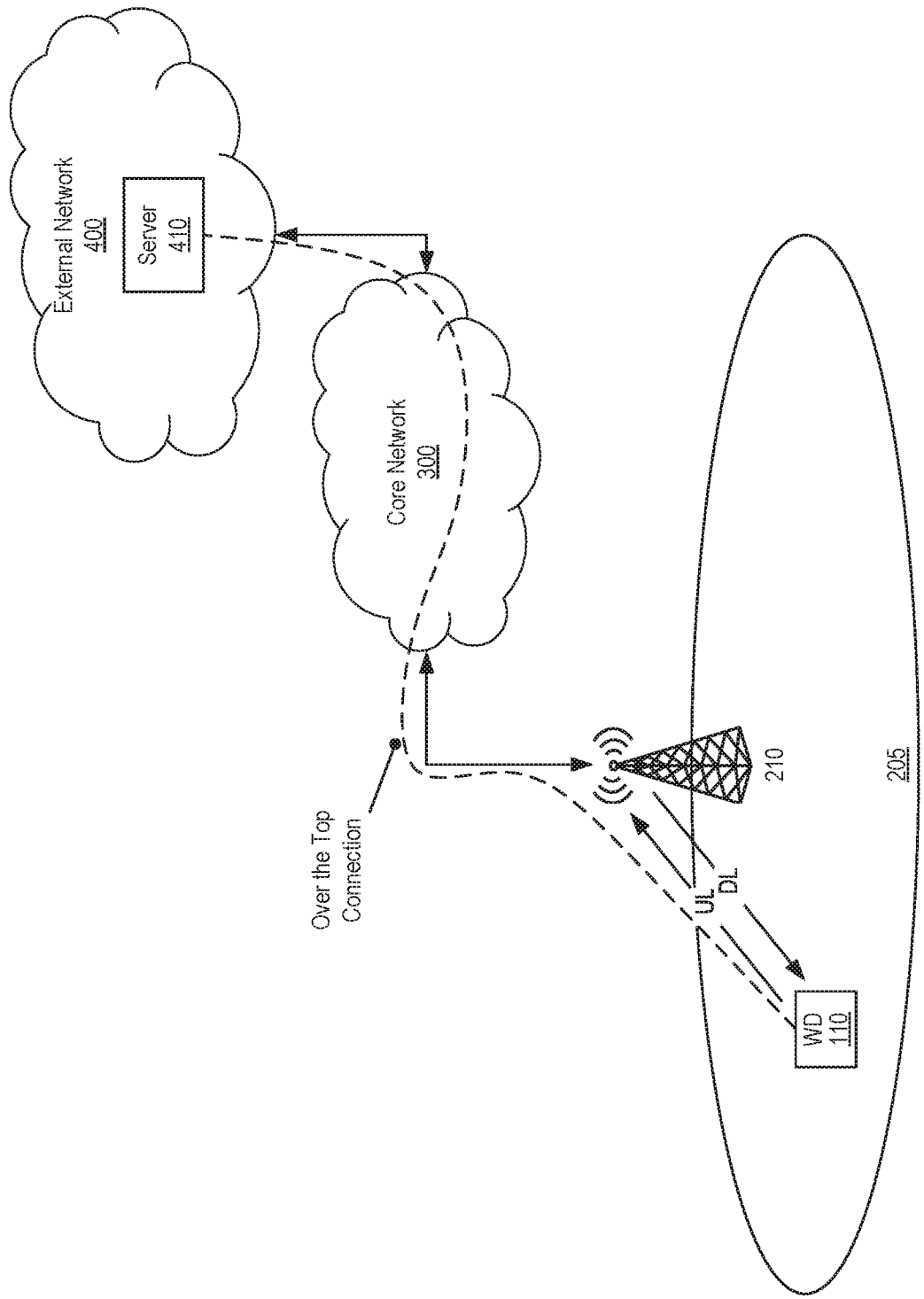
FIG. 8 is a schematic diagram of a portion of an example wireless communication network showing example signaling according to some embodiments.

Turning now to FIG. 8, additional details of the radio interface between a wireless device 110 and a radio network node 210 are shown. As illustrated, the radio interface generally enables the wireless device 110 and the radio network node 210 to exchange signals and messages in both a downlink direction, that is from the radio network node 210 to the wireless device 110, and in an uplink direction, that is from the wireless device 110 to the radio network node 210.

The radio interface between the wireless device 110 and the radio network node 210 typically enables the wireless device 110 to access various applications or services provided by one or more servers 410 (also referred to as application server or host computer) located in the external network(s) 400. The connectivity between the wireless device 110 and the server 410, enabled at least in part by the radio interface between the wireless device 110 and the radio network node 210, may be described as an over-the-top (OTT) or application layer connection. In such cases, the wireless device 110 and the server 410 are configured to exchange data and/or signaling via the OTT connection, using the radio access network 200, the core network 300, and possibly one or more intermediate networks (e.g., a transport network) (not shown). The OTT connection may be transparent in the sense that the participating communication devices or nodes (e.g., the radio network node, one or more core network nodes, etc.) through which the OTT connection passes may be unaware of the actual OTT connection they enable and support. For example, the radio network node 210 may not or need not be informed about the previous handling (e.g., routing) of an incoming downlink communication with data originating from the server 410 to be forwarded or transmitted to the wireless device 110. Similarly, the radio network node 210 may not or need not be aware of the subsequent handling of an outgoing uplink communication originating from the wireless device 110 towards the server 410.

Figure 9:
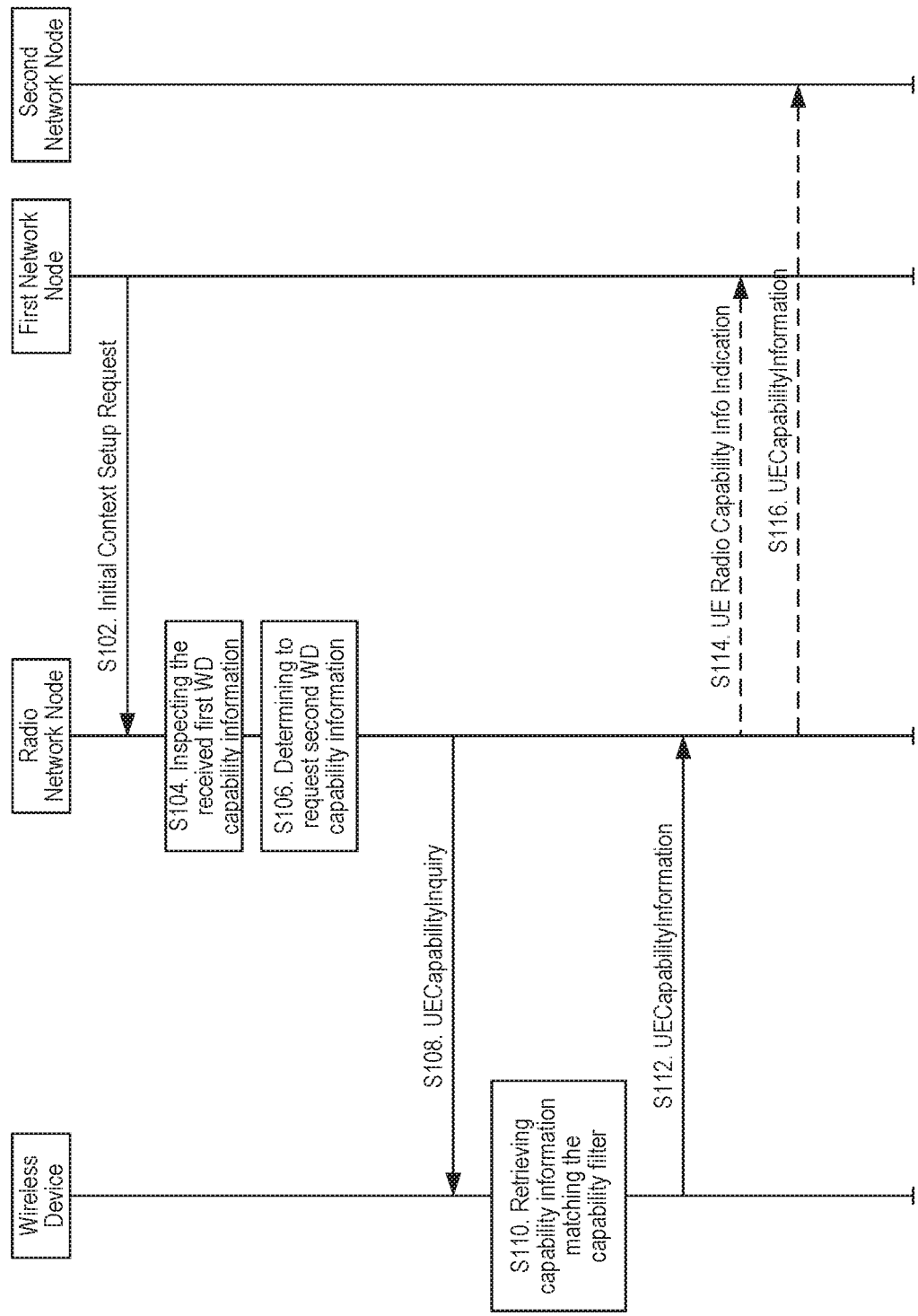
FIG. 9 is a signaling and operating diagram according to some embodiments.

Referring to FIG. 9, a high-level signaling and operating diagram according to some embodiments is illustrated. As illustrated, the radio network node 210 (e.g., an NG-RAN node) receives, from a first network node, first wireless device capability information associated with a wireless device 110 (action S102). If the first network node is a core network node 310 (e.g., an AMF), the first wireless device capability information may be received in an Initial Context Setup Request message (as per section 8.3.1 of 3GPP TS 38.413 V15.2.0) or in another message. If the first network node is another radio network node 210 (e.g., a source radio network node 210), the first wireless device capability information may be received in a Handover Request message (as per section 8.2.1.2 of 3GPP TS 38.423 V15.2.0) or in another message (not shown in FIG. 9).

Upon receiving the first wireless device capability information, the radio network node 210 may inspect the received first wireless device capability information to determine, for instance, whether new or additional wireless device capability information are required. In some embodiments, the radio network node 210 may use the RF-Parameters information element (IE) (present in the UE-NR-Capability IE), reproduced below, when inspecting the received first wireless device capability information.

RF-Parameters information element

```
-- ASN1START
-- TAG-RF-PARAMETERS-START
RF-Parameters ::=          SEQUENCE {
    supportedBandListNR            SEQUENCE (SIZE (1..maxBands)) OF BandNR,
    supportedBandCombinationList   BandCombinationList        OPTIONAL,
    appliedFreqBandListFilter      FreqBandList               OPTIONAL,
    ...,
    [[
    supportedBandCombinationList-v1540 BandCombinationList-v1540   OPTIONAL,
    srs-SwitchingTimeRequested         ENUMERATED {true}           OPTIONAL
    ]]
}
```

The RF-Parameters information element comprises the field appliedFreqBandListFilter itself containing FreqBandList which contains a list of frequency bands as shown below.

| FreqBandList information element |
|---|
| -- ASN1START<br>-- TAG-FREQBANDLIST-START<br>FreqBandList ::=           SEQUENCE (SIZE (1..maxBandsMRDC)) OF FreqBandInformation<br>FreqBandInformation ::=     CHOICE {<br>   bandInformationEUTRA        FreqBandInformationEUTRA,<br>   bandInformationNR           FreqBandInformationNR<br>}<br>FreqBandInformationEUTRA ::= SEQUENCE {<br>   bandEUTRA                   FreqBandIndicatorEUTRA,<br>   ca-BandwidthClassDL-EUTRA   CA-BandwidthClassEUTRA        OPTIONAL, -- Need N<br>   ca-BandwidthClassUL-EUTRA   CA-BandwidthClassEUTRA        OPTIONAL -- Need N<br>}<br>FreqBandInformationNR ::=    SEQUENCE {<br>   bandNR                      FreqBandIndicatorNR,<br>   maxBandwidthRequestedDL     AggregatedBandwidth           OPTIONAL, -- Need N<br>   maxBandwidthRequestedUL     AggregatedBandwidth           OPTIONAL, -- Need N<br>   maxCarriersRequestedDL      INTEGER (1..maxNrofServingCells) OPTIONAL -- Need N<br>   maxCarriersRequestedUL      INTEGER (1..maxNrofServingCells) OPTIONAL -- Need N<br>}<br>AggregatedBandwidth ::=     ENUMERATED {mhz50, mhz100, mhz150, mhz200, mhz250, mhz300, mhz350,<br>                 mhz400, mhz450, mhz500, mhz550, mhz600, mhz650, mhz700, mhz750, mhz800}<br>-- TAG-FREQBANDLIST-STOP<br>-- ASN1STOP |

In some embodiments, the radio network node 210 may determine whether new or additional wireless device capability information are required by comparing one or more parameters associated with the first wireless device capability information with parameters supported by the radio network node 210. For instance, the radio network node 210 may compare the frequency bands included in the first wireless device capability information with frequency bands supported by the radio network node 210. Other comparisons are possible.

Regardless, the radio network node then determines the required second wireless device capability information (action S106).

The radio network node 210 then sends a request for capability information (e.g., an RRC UECapabilityInquiry message) to the wireless device 110 (action S108). The request for capability information comprises a capability filter to allow the wireless device 110 to only report capability information which match the capability filter.

In some embodiments, the capability filter may be based on a union of the first wireless device capability information and of the second wireless device capability information.

In some embodiments, the first wireless device capability information comprise capability information related to a first set of parameters (e.g., a first set of frequency bands), and the second wireless device capability information comprise capability information related to a second set of parameters (e.g., a second set of frequency bands). In some embodiments, the capability filter may be based, at least in part, on the first set of parameters and on the second set of parameters. In some embodiments, the capability filter may be based on a union of the first set of parameters and of the second set of parameters (e.g., a union of the first set of frequency bands and of the second set of frequency bands).

Upon receiving the request for capability information from the radio network node 210, the wireless device 110 obtains or otherwise retrieves the capability information that match the capability filter (action S110). The wireless device 110 then sends the requested capability information (referred to as third wireless device capability information) in a response (e.g., an RRC UECapabilityInformation message) to the radio network node 210 (action S112).

Upon receiving the third wireless device capability information from the wireless device 110, the radio network node 210 may store the third wireless device capability information locally. Optionally, the radio network node 210 may send the third wireless device capability information to the first network node (action S114) and/or to a second network node (e.g., a core network node, another radio network node, etc.) (action S116). If the first network node is a core network node 310 (e.g., an AMF), the radio network node 210 may send the third wireless device capability information to the core network node 310 in a UE Radio Capability Info Indication message (as per section 8.14.1 of 3GPP TS 38.413 V15.2.0).

Optionally, the radio network node 210 may use the capability filter determined for the wireless device 110 to obtain the wireless device capability information of another wireless device 110.

Figure 10:
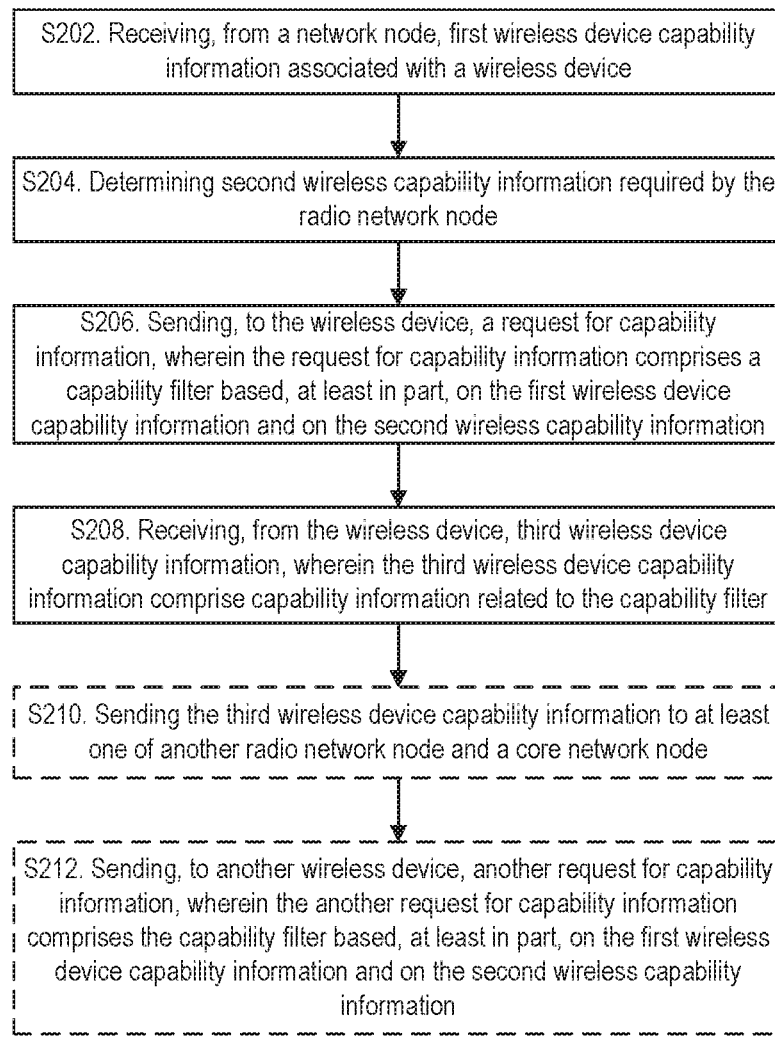
FIG. 10 is a flow chart of operations of a radio network node according to some embodiments.

FIG. 10 is a flow chart illustrating operations of the radio network node 210 according to some embodiments. As illustrated, the radio network node 210 receives, from a network node (e.g., a core network node, another radio network node), first wireless device capability information associated with a wireless device 110 (action S202). If the network node is a core network node 310 (e.g., an AMF), the radio network node 210 may receive the first wireless device capability information via an Initial Context Setup Request message. If the network node is another radio network node 210, the radio network node 210 may receive the first wireless device capability information via a Handover Request message.

The radio network node 210 then determines second wireless device capability information which may be required by the radio network node 210 (action S204). The radio network node 210 may determine these second wireless device capability information by comparing the first wireless device capability information received from the network node with capabilities of the radio network node 210. These capabilities of the radio network node 210 may be configuration or operational parameters of the radio network node 210 (e.g., frequency bands supported by the radio network node 210).

Once the radio network node 210 has determined the second wireless device capability information, the radio network node 210 sends, to the wireless device 110, a request for capability information, wherein the request for capability information comprises a capability filter. The request for capability information may be an RRC UECapabilityEnquiry message as per section 5.6.1 of 3GPP TS 38.331 V15.4.0.

In some embodiments, the capability filter may be based, at least in part, on the first wireless device capability information and on the second wireless device capability information.

In some embodiments, the capability filter may be based on a union of the first wireless device capability information and the second wireless device capability information.

In some embodiments, the first wireless device capability information comprise capability information related to, or associated with, a first set of parameters, and the second wireless device capability information comprise capability information related to, or associated with, a second set of parameters. In such cases, the capability filter may be based, at least in part, on the first set of parameters and on the second set of parameters. In other cases, the capability filter may be based on a union of the first set of parameters and the second set of parameters. In some embodiments, the first set of parameters may comprise a first set of frequency bands, and the second set of parameters may comprise a second set of frequency bands.

Following the sending of the request for capability information to the wireless device 110, the radio network node 210 receives third wireless device capability information from the wireless device 110, the third wireless device capability information comprise capability information related to the capability filter. The radio network node 210 may receive the third wireless device capability information in an RRC UECapabilityInformation message as per section 5.6.1 of 3GPP TS 38.331 V15.4.0.

The third wireless device capability information may be obtained (e.g., derived, retrieved, etc.) by the wireless device 110 using the capability filter. For instance, the wireless device may obtain the third wireless device capability information by obtaining wireless device capability information matching the capability filter.

Following the reception of the third wireless device capability information from the wireless device 110, the radio network node 210 may store the wireless device capability information locally.

Optionally, the radio network node 210 may send the third wireless device capability information to the network node from which the radio network node 210 received the first wireless device capability information, and/or to another network node (e.g., another radio network node, a core network node, etc.) (action S210). If the radio network node 210 sends the third wireless device capability information to a core network node 310 (e.g., an AMF), then the radio network node 210 may send the third wireless device capability information in a UE Radio Capability Info Indication message as per section 8.14.1 of 3GPP TS 38.413 V15.2.0.

Optionally, the radio network node 210 may use the capability filter previously determined to request wireless device capability information from another wireless device 110 (action S212).

It is to be noted that in the previously described signaling and operating diagram and flow chart, unless the description clearly indicates a certain relationship (e.g., causal, conditional, temporal, etc.) between two or more actions, the described actions may be performed in a different sequence than the one illustrated. For example, two actions shown performed in succession may be performed substantially concurrently, or even in the reverse order. Hence, the illustrated sequence of actions is only indicative of one particular sequence of actions and does not suggest that this is the only possible sequence.

Some embodiments of a wireless device (WD) 110 will now be described referring to FIG. 11. Though the expression "wireless device" is used throughout the description, it is to be understood that the expression is used generically. A wireless device generally refers to a device arranged, capable, configured, and/or operable to communicate wirelessly with one or more radio network nodes or with one or more other wireless devices (e.g., via device-to-device (D2D) communication). In other words, a wireless device is a device arranged, capable, configured, and/or operable to perform wireless communications. A wireless device may be portable (or mobile) or may be stationary or fixed at a certain location. In some embodiments, a wireless device may be configured to transmit and/or receive information without direct human interaction. Such a wireless device may be called a Machine Type Communication (MTC) device or a Machine-to-Machine (M2M) device.

Different communication standards may use different terminology when referring to or describing a wireless device. For instance, 3GPP uses the terms User Equipment (UE), Mobile Equipment (ME), and Mobile Terminal (MT). 3GPP2 uses the terms Access Terminal (AT) and Mobile Station (MS). IEEE 802.11 (also known as WiFi™) uses the term station (STA). Understandably, the generic expression "wireless device" encompasses these terms.

Figure 11:
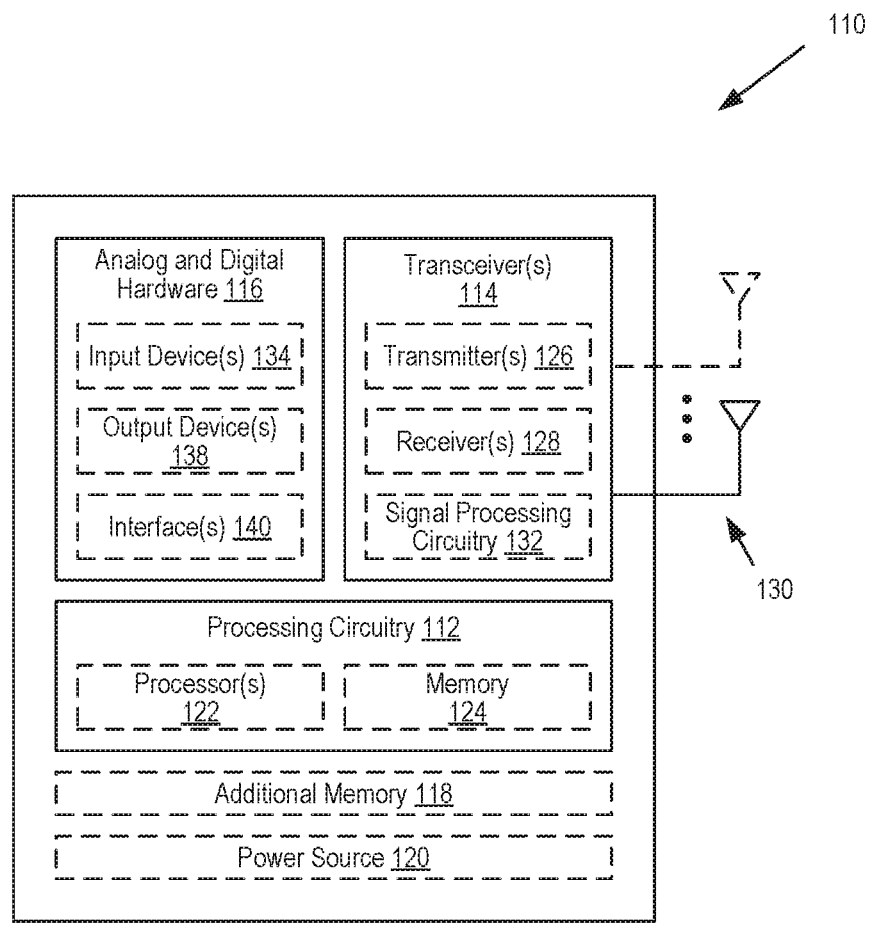
FIG. 11 is a block diagram of a wireless device according to some embodiments.

FIG. 11 is a block diagram of an example of a wireless device 110 according to some embodiments. Wireless device 110 includes processing circuitry 112, one or more transceivers 114, and usually additional analog and digital hardware 116. The wireless device 110 may also comprise additional memory 118 and a power source 120 (e.g., a battery).

The processing circuitry 112 usually provides overall control of the wireless device 110. Hence, the processing circuitry 112 is generally responsible for the various functions of the wireless device 110, either directly or indirectly via one or more other components of the wireless device (e.g., sending or receiving messages via the transceiver 114). The processing circuitry 112 may include any suitable combination of hardware to enable the wireless device 110 to perform the functions of wireless device 110 described above. In some embodiments, the processing circuitry 112 may comprise at least one processor 122 and at least one memory 124. Examples of processor 122 include, but are not limited to, a central processing unit (CPU), a graphical processing unit (GPU), and other forms of processing unit. Examples of memory 124 include, but are not limited to, Random Access Memory (RAM) and Read Only Memory (ROM). When processing circuitry 112 comprises memory 124, memory 124 is generally configured to store instructions or codes executable by processor 122, and possibly operational data. Processor 122 is then configured to execute the stored instructions and possibly create, transform, or otherwise manipulate data to enable the wireless device 110 to perform the functions of wireless device 110 described above. Additionally, or alternatively, in some embodiments, the processing circuitry 112 may comprise one or more application-specific integrated circuits (ASICs), one or more complex programmable logic device (CPLDs), one or more field-programmable gate arrays (FPGAs), or other forms of application-specific and/or programmable circuitry. When the processing circuitry 112 comprises application-specific and/or programmable circuitry (e.g., ASICs, FPGAs), the wireless device 110 may perform the functions of wireless device 110 described above without the need for instructions or codes as the necessary instructions may already be hardwired or preprogrammed into the processing circuitry 112. Understandably, the processing circuitry 112 may comprise a combination of processor(s) 122, memory(ies) 124, and other application-specific and/or programmable circuitry.

The transceiver 114 facilitates transmitting wireless signals to and receiving wireless signals from radio network node 210 and/or other wireless devices 110. Transceiver 114 typically includes one or more transmitters (Tx) 126, and one or more receivers (Rx) 128, both the transmitter(s) 126 and the receiver(s) 128 connected to one or more antennas 130. Transceiver 114 may also comprise signal processing circuitry 132 configured to process the data received from the processing circuitry 112 for transmission via the transmitter(s) 126 and antenna(s) 130, and to process the wireless signals received via the antenna(s) 130 and receiver(s) 128. Signal processing circuitry 132 may comprise any suitable combination of analog signal processing hardware (e.g., amplifier, filter, etc.) and digital signal processing hardware (e.g., digital signal processor (DSP)).

When present, additional memory 118 may comprise any form of memory, including volatile and/or non-volatile memory, configured to store instructions and/or data that may be used by the processing circuitry 112 of the wireless device 110. Examples of additional memory 118 include, but are not limited to, mass storage media (e.g., a hard disk drive, a solid-state drive), removable storage media (e.g., a Compact Disk (CD), a Digital Video Disk (DVD), a memory card).

Power source 120 may, in some embodiments, be in the form of a battery or battery pack. Other types of power sources, such as an external power source (e.g., an electricity outlet), photovoltaic devices or power cells, may also be used.

As indicated above, in some embodiments, the wireless device 110 may comprise additional analog and digital hardware 116. In some embodiments, the additional analog and digital hardware 116 may comprise one or more input devices 134 for entry of data into wireless device 110. For example, input devices may include one or more microphones, one or more cameras, a touch screen, one or more sensors, etc. Additional analog and digital hardware 116 may additionally or alternatively comprise one or more output devices 136 for outputting data from the wireless device 110. For example, output devices may include one or more speakers, a screen (which may be a touch screen), a vibrating mechanism, one or more actuators, etc. Additional analog and digital hardware 116 may additional or alternatively comprise one or more interfaces 140 to connect the wireless device 110 to external peripherals. Examples of interfaces include, but are not limited to, an Ethernet port, HDMI port(s), USB port(s), etc.

Embodiments of a radio network node 210 will now be described referring to FIGS. 12 and 13. Though the expression "radio network node" is used throughout the description, it is to be understood that the expression is used generically. A radio network node generally refers to an equipment, or a combination of equipments, arranged, capable, configured, and/or operable to communicate directly or indirectly with a wireless device and/or with other network nodes (e.g., other radio network nodes, core network nodes, etc.) in the wireless communication network to enable and/or provide wireless access to the wireless device and/or to perform other functions (e.g., administration) in the wireless communication network.

Different communication standards may use different terminology when referring to or describing a radio network node. For instance, 3GPP uses the terms Node B (NB), evolved Node B (eNB), next-generation Node B (gNB), Next-Generation Radio Access Network node (NG-RAN node), Radio Network Controller (RNC), and Base Station (BS). 3GPP2 uses the terms Access Node (AN), Base Station (BS), and Base Station Controller (BSC). IEEE 802.11 (also known as WiFi™) uses the access point (AP). Understandably, the generic expression "radio network node" encompasses these terms.

Figure 12:
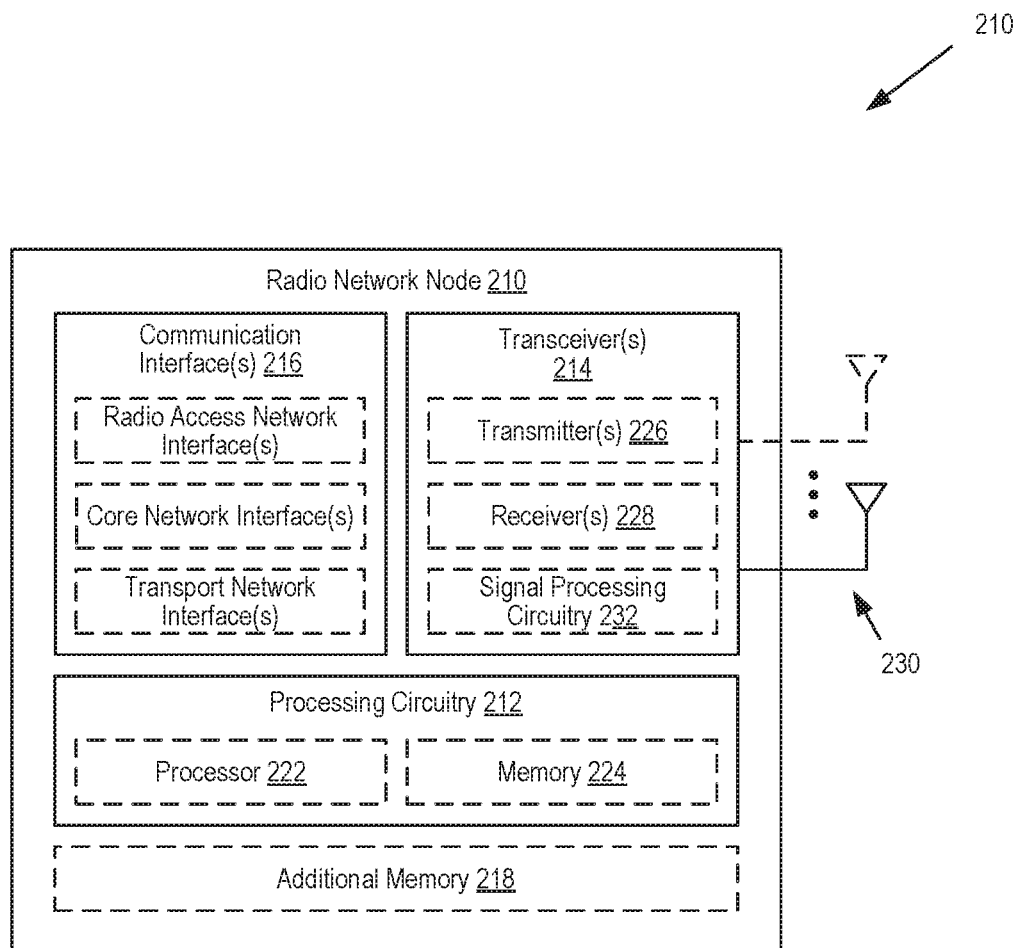
FIG. 12 is a block diagram of a radio network node according to some embodiments.

FIG. 12 is a block diagram of an example of a radio network node 210 according to some embodiments. Radio network node 210 generally includes processing circuitry 212, one or more transceivers 214, and communication interface(s) 216. Radio network node 210 may also comprise additional memory 218.

The processing circuitry 212 usually provides overall control of the radio network node 210. Hence, the processing circuitry 212 is generally responsible for the various functions of the radio network node 210, either directly or indirectly via one or more other components of the radio network node (e.g., sending or receiving messages via the transceiver 214). The processing circuitry 212 may include any suitable combination of hardware to enable the radio network node 210 to perform its functions. In some embodiments, the processing circuitry 212 may comprise at least one processor 222 and at least one memory 224. Examples of processor 222 include, but are not limited to, a central processing unit (CPU), a graphical processing unit (GPU), and other forms of processing unit. Examples of memory 224 include, but are not limited to, Random Access Memory (RAM) and Read Only Memory (ROM). When processing circuitry 212 comprises memory 224, memory 224 is generally configured to store instructions or codes executable by the processor 222, and possibly operational data. The processor 222 is then configured to execute the stored instructions and possibly create, transform, or otherwise manipulate data to enable the radio network node 210 to perform its functions. Additionally, or alternatively, in some embodiments, the processing circuitry 212 may comprise one or more application-specific integrated circuits (ASICs), one or more complex programmable logic device (CPLDs), one or more field-programmable gate arrays (FPGAs), or other forms of application-specific and/or programmable circuitry. When the processing circuitry 212 comprises application-specific and/or programmable circuitry (e.g., ASICs, CPLDs, FPGAs, etc.), the radio network node 210 may perform its functions without the need for instructions or codes as the necessary instructions may already be hardwired or preprogrammed into the processing circuitry 212. Understandably, the processing circuitry 212 may comprise a combination of one or more processors 222, memories 224, and other application-specific and/or programmable circuitry.

The transceiver 214 facilitates transmitting wireless signals to and receiving wireless signals from wireless devices 110 and/or other radio network node 210. Transceiver 214 typically includes one or more transmitters (Tx) 226, and one or more receivers (Rx) 228 connected to one or more antennas 230. Transceiver 214 may also comprise signal processing circuitry 232 configured to process the data received from the processing circuitry 212 for transmission via the transmitter(s) 226 and antenna(s) 230, and to process the wireless signals received via the antenna(s) 230 and receiver(s) 228. Signal processing circuitry 232 may comprise any suitable combination of analog signal processing hardware (e.g., amplifier, filter, etc.) and digital signal processing hardware (e.g., digital signal processor (DSP)).

When present, additional memory 218 may comprise any form of memory, including volatile and/or non-volatile memory, configured to store instructions and/or data that may be used by the processing circuitry 212. Examples of additional memory 218 include, but are not limited to, mass storage media (e.g., a hard disk drive, a solid-state drive), removable storage media (e.g., a Compact Disk (CD), a Digital Video Disk (DVD), a memory card).

The communication interface 216 enables the radio network node 210 to send messages to and receive messages from other network nodes (e.g., other radio network nodes, core network nodes, servers, etc.). In that sense, the communication interface 216 generally comprises the necessary hardware and software to process messages received from the processing circuitry 212 to be sent by the radio network node 210 into a format appropriate for the underlying transport network and, conversely, to process messages received from other network nodes over the underlying transport network into a format appropriate for the processing circuitry 212. The communication interface 216 may therefore comprises the appropriate instructions to process messages exchanged over logical interfaces including, but not limited to, radio access network interfaces (e.g., the X2 and Xn logical interfaces) and core network interfaces (e.g., the S1 and N2 logical interfaces). Hence, communication interface 216 may comprise appropriate hardware (e.g., port, modem, network interface card, etc.) and software, including protocol conversion and data processing capabilities, to communicate with other network nodes.

Figure 13:
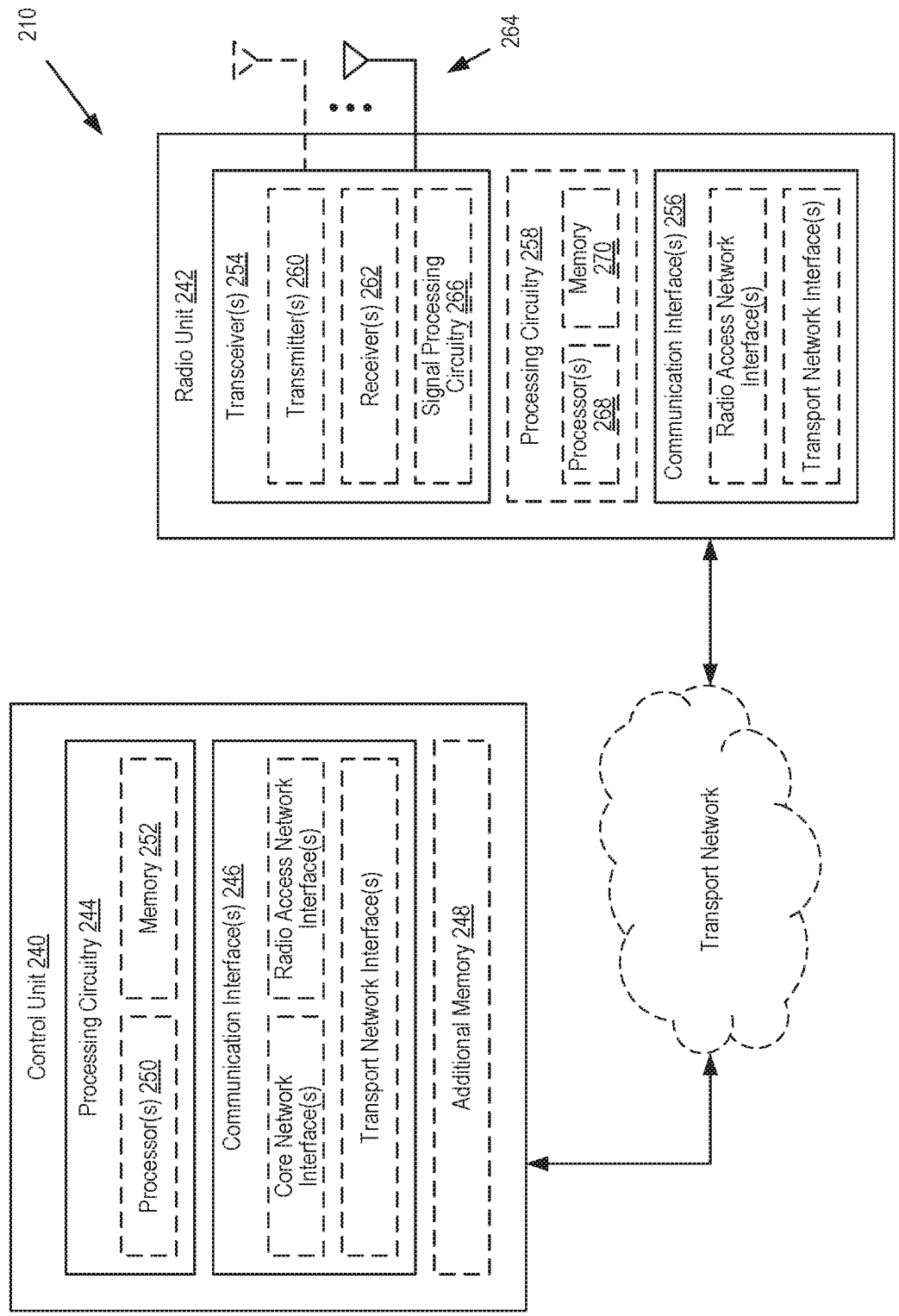
FIG. 13 is another block diagram of a radio network node according to some embodiments.

FIG. 13 is a block diagram of an example of a distributed radio network node 210 according to some embodiments. A distributed radio network node 210, such as the example illustrated in FIG. 13, is distributed in the sense that the radio network node 210 components, and their associated functions, are essentially separated into two main units (or sub-radio network nodes) which may be referred to as a control unit 240 and a radio unit 242. Different distributed radio network node architectures are possible. For instance, in some architectures, the radio unit 242 is connected to the control unit 240 via dedicated wired or wireless link (e.g., an optical fiber cable) while in other architectures, the radio unit 242 is connected to the control unit 240 via a transport network. Also, how the functions of the radio network node 210 are separated between the control unit 240 and radio unit 242 may vary depending on the chosen architecture.

The control unit 240 generally includes processing circuitry 244 and communication interface(s) 246. Control unit 240 may also comprise additional memory 248.

The processing circuitry 244 usually provides overall control of the control unit 240 of the radio network node 210. The processing circuitry 244 is generally responsible for at least some functions of the radio network node 210, either directly or indirectly via one or more other components of the control unit 240 (e.g., sending or receiving messages via the communication interface 246). The processing circuitry 244 may include any suitable combination of hardware to enable the control unit 240 to perform its share of the functions of radio network node 210. In some embodiments, the processing circuitry 244 may comprise at least one processor 250 and at least one memory 252. Examples of processor 250 include, but are not limited to, a central processing unit (CPU), a graphical processing unit (GPU), and other forms of processing unit. Examples of memory 252 include, but are not limited to, Random Access Memory (RAM) and Read Only Memory (ROM). When processing circuitry 244 comprises memory 252, memory 252 is generally configured to store instructions or codes executable by processor 250, and possibly operational data. Processor 250 is then configured to execute the stored instructions and possibly create, transform, or otherwise manipulate data to enable the control unit 240 to perform its share of the functions of radio network node 210. Additionally, or alternatively, in some embodiments, the processing circuitry 244 may comprise one or more application-specific integrated circuits (ASICs), one or more complex programmable logic device (CPLDs), one or more field-programmable gate arrays (FPGAs), or other forms of application-specific and/or programmable circuitry. When the processing circuitry 244 comprises application-specific and/or programmable circuitry (e.g., ASICs, CLPDs, FPGAs, etc.), the control unit 240 may perform its share of the functions of radio network node 210 without the need for instructions or codes as the necessary instructions may already be hardwired or preprogrammed into the processing circuitry 244. Understandably, the processing circuitry 244 may comprise a combination of one or processors 250, memories 252, and other application-specific and/or programmable circuitry.

The communication interface(s) 246 enable the control unit 240 to send messages to and receive messages from the radio unit 242 and possibly to and from other network nodes (e.g., other radio network nodes, core network nodes, servers, etc.). In that sense, the communication interface 246 generally comprises the necessary hardware and software to process messages to be sent by control unit 240 into a format appropriate for the underlying transport network and, conversely, to process messages received by the control unit 240 (e.g., from the radio unit 242) via the underlying transport network. Hence, communication interface 246 may comprise appropriate hardware (e.g., port, modem, network interface card, etc.) and software, including protocol conversion and data processing capabilities, to communicate with other network nodes.

When present, additional memory 248 may comprise any form of memory, including volatile and/or non-volatile memory, configured to store instructions and/or data that may be used by the processing circuitry 244. Examples of additional memory 248 include, but are not limited to, mass storage media (e.g., a hard disk drive, a solid-state drive), removable storage media (e.g., a Compact Disk (CD), a Digital Video Disk (DVD), a memory card).

The radio unit 242 generally includes one or more transceivers 254, and communication interface(s) 256. Control unit 240 may also comprise processing circuitry 248.

The transceiver 254 facilitates transmitting wireless signals to and receiving wireless signals from wireless devices 110 and/or other radio network node 210. Transceiver 254 typically includes one or more transmitters (Tx) 260, and one or more receivers (Rx) 262 connected to one or more antennas 264. Transceiver 254 may also comprise signal processing circuitry 266 configured to process the data received from the communication interface 256 or from the processing circuitry 258 if present, for transmission via the transmitter(s) 260 and antenna(s) 264, and to process the wireless signals received via the antenna(s) 264 and receiver(s) 262. Signal processing circuitry 266 may comprise any suitable combination of analog signal processing hardware (e.g., amplifier, filter, etc.) and digital signal processing hardware (e.g., digital signal processor (DSP)).

The communication interface(s) 256 enable the radio unit 242 to send messages to and receive messages from the control unit 240 and possibly to and from other network nodes (e.g., other radio network nodes, core network nodes, servers, etc.). In that sense, the communication interface 256 generally comprises the necessary hardware and software to process messages to be sent by radio unit 242 into a format appropriate for the underlying transport network and, conversely, to process messages received by the radio unit 242 (e.g., from the control unit 240) via the underlying transport network. Hence, communication interface 256 may comprise appropriate hardware (e.g., port, modem, network interface card, etc.) and software, including protocol conversion and data processing capabilities, to communicate with other network nodes.

When present, the processing circuitry 258 usually provides overall control of the radio unit 242. The processing circuitry 258 is generally responsible for at least some functions of the radio network node 210, either directly or indirectly via one or more other components of the radio unit 242 (e.g., sending or receiving messages via the transceiver 254, sending or receiving messages via the communication interface 256). The processing circuitry 258 may include any suitable combination of hardware to enable the radio unit 242 to perform its share of the functions of radio network node 210. In some embodiments, the processing circuitry 258 may comprise at least one processor 268 and at least one memory 270. Examples of processor 268 include, but are not limited to, a central processing unit (CPU), a graphical processing unit (GPU), and other forms of processing unit. Examples of memory 270 include, but are not limited to, Random Access Memory (RAM) and Read Only Memory (ROM). When processing circuitry 258 comprises memory 270, memory 270 is generally configured to store instructions or codes executable by processor 268, and possibly operational data. Processor 268 is then configured to execute the stored instructions and possibly create, transform, or otherwise manipulate data to enable the radio unit 242 to perform its share of the functions of radio network node 210. Additionally, or alternatively, in some embodiments, the processing circuitry 258 may comprise one or more application-specific integrated circuits (ASICs), one or more complex programmable logic device (CPLDs), one or more field-programmable gate arrays (FPGAs), or other forms of application-specific and/or programmable circuitry. When the processing circuitry 258 comprises application-specific and/or programmable circuitry (e.g., ASICs, CLPDs, FPGAs, etc.), the radio unit 242 may perform its share of the functions of radio network node 210 without the need for instructions or codes as the necessary instructions may already be hardwired or preprogrammed into the processing circuitry 258. Understandably, the processing circuitry 258 may comprise a combination of one or processors 268, memories 270, and other application-specific and/or programmable circuitry.

Embodiments of a core network node 310 will now be described referring to FIG. 14. Though the expression "core network node" is used throughout the description, it is to be understood that the expression is used generically. A core network node generally refers to a network node arranged, capable, configured, and/or operable to communicate with one or more radio network nodes, with one or more other core network nodes, and/or possibly with network nodes or servers in the external network(s) 410. Understandably, different core network nodes 310 may provide or enable different functionalities (e.g., access management, mobility management, data transfer, etc.) in the wireless communication network 100.

Different core network architectures may use different terminology when referring to the various core network nodes that can be deployed. For instance, the 3GPP Evolved Packet Core (EPC) architecture comprises Mobility Management Entity (MME), Serving Gateway (SGW), and Packet Data Network (PDN) Gateway (PGW), while the 3GPP 5G Core (5GC) architecture comprises Access and Mobility Management Function (AMF), Session Management Function (SMF), and User Plane Function (UPF). A more complete list of the different core network nodes 310 can be found in 3GPP TS 23.401 and 23.501.

Figure 14:
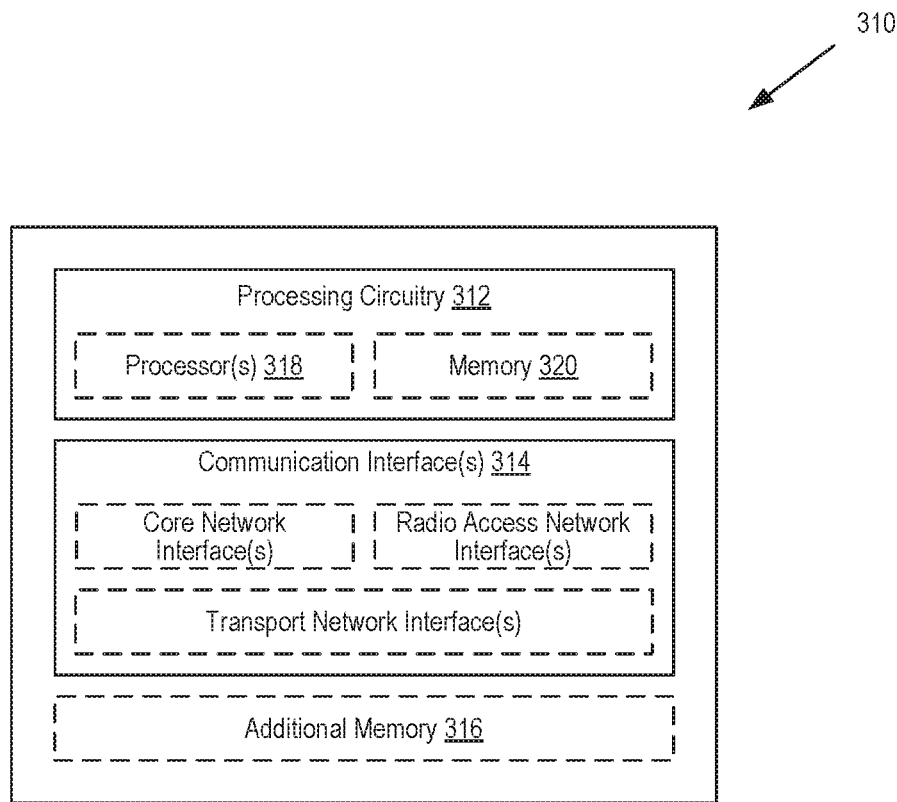
FIG. 14 is a block diagram of a core network node according to some embodiments.

FIG. 14 is a block diagram of an example of a core network node 310 according to some embodiments. The example of the core network node shown in FIG. 14 may be referred to as a standalone core network node 310 in which the functionalities of the core network node 310 are provided by a dedicated network node.

Core network node 310 usually includes processing circuitry 312 and communication interface(s) 314. Core network 310 may also include external memory 316.

Processing circuitry 312 usually provides overall control of the core network node 310. Hence, processing circuitry 312 is generally responsible for the various functions of the core network node 310, either directly or indirectly via one or more other components of the core network node 310 (e.g., sending or receiving messages via the communication interface 314). The processing circuitry 312 may include any suitable combination of hardware to enable the core network node 310 to perform the functions of core network node 310 described above. In some embodiments, the processing circuitry 312 may comprise at least one processor 318 and at least one memory 320. Examples of processor 318 include, but are not limited to, a central processing unit (CPU), a graphical processing unit (GPU), and other forms of processing unit. Examples of memory 320 include, but are not limited to, Random Access Memory (RAM) and Read Only Memory (ROM). When processing circuitry 312 comprises memory 320, memory 320 is generally configured to store instructions or codes executable by processor 318, and possibly operational data. Processor 318 is then configured to execute the stored instructions and possibly create, transform, or otherwise manipulate data to enable the core network node 310 to perform the functions of core network node 310 described above. Additionally, or alternatively, in some embodiments, the processing circuitry 312 may comprise, or further comprise, one or more application-specific integrated circuits (ASICs), one or more complex programmable logic device (CPLDs), one or more field-programmable gate arrays (FPGAs), or other forms of application-specific and/or programmable circuitry. When the processing circuitry 312 comprises application-specific and/or programmable circuitry (e.g., ASICs, FPGAs), the core network node 310 may perform the functions of core network node 310 described above without the need for instructions or codes as the necessary instructions may already be hardwired or preprogrammed into processing circuitry 312. Understandably, processing circuitry 312 may comprise a combination of processor(s) 318, memory(ies) 320, and other application-specific and/or programmable circuitry.

When present, additional memory 316 may comprise any form of memory, including volatile and/or non-volatile memory, configured to store instructions and/or data that may be used by the processing circuitry 312. Examples of additional memory 118 include, but are not limited to, mass storage media (e.g., a hard disk drive, a solid-state drive), removable storage media (e.g., a Compact Disk (CD), a Digital Video Disk (DVD), a memory card).

The communication interface(s) 314 enable the core network node 310 to send messages to and receive messages from other network nodes (e.g., radio network nodes, other core network nodes, servers, etc.). In that sense, the communication interface 314 generally comprises the necessary hardware and software to process messages received from the processing circuitry 312 to be sent by the core network node 310 into a format appropriate for the underlying transport network and, conversely, to process messages received from other network nodes over the underlying transport network into a format appropriate for the processing circuitry 312. Hence, communication interface 314 may comprise appropriate hardware (e.g., port, modem, network interface card, etc.) and software, including protocol conversion and data processing capabilities, to communicate with other network nodes.

Some embodiments may be represented as a non-transitory software product stored in a machine-readable medium (also called a computer-readable medium, a processor-readable medium, or a computer usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

References in the specification to "one embodiment," "an embodiment," "an example embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a," "an," and "the" should include the plural forms, unless the context indicates otherwise. It will be further understood that the terms "comprises," "comprising," "includes," and/or "including" when used, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used should be interpreted as having a meaning that is consistent with their meaning in the context of this specification and the relevant art and will not be interpreted in an idealized or overly formal sense unless expressly so defined herein.

The above-described embodiments are examples only. Alterations, modifications and variations may be effected to the particular embodiments by those of skill in the art without departing from the scope of the description.

ABBREVIATIONS AND ACRONYMS

The present description may comprise these abbreviations and/or acronyms:
3GPP Third Generation Partnership Project
AMF Access and Mobility Management Function
CN Core Network
D2D Device-to-Device
eNB evolved Node B
EPC Evolved Packet Core
E-UTRAN Evolved Universal Terrestrial Radio Access Network
GGSN Gateway GPRS Support Node
gNB Next Generation Node B (a Node B supporting NR)
LTE Long Term Evolution
MME Mobility Management Entity
NB Node B
NGC Next Generation Core
NR New Radio
PGW Packet Data Network Gateway
RAN Radio Access Network
RNC Radio Network Controller
RRC Radio Resource Control
SGSN Serving GPRS Support Node
SGW Serving Gateway
SMF Session Management Function
UE User Equipment
UMTS Universal Mobile Telecommunications System
UPF User Plane Function
UTRAN Universal Terrestrial Radio Access Network

RELATED STANDARD REFERENCES

The following references may be related to the present description:
3GPP TS 23.501 V15.4.0
3GPP TS 23.502 V15.4.1
3GPP TS 38.300 V15.4.0
3GPP TS 38.331 V15.4.0
3GPP TS 38.413 V15.2.0
3GPP TS 38.423 V15.2.0

What is claimed is:

1. A method in a radio network node, the method comprising:
receiving, from a network node, first wireless device capability information associated with a wireless device;
determining second wireless device capability information required by the radio network node; and
sending, to the wireless device, a request for capability information, the request for capability information comprising a capability filter based, at least in part, on the first wireless device capability information and on the second wireless device capability information.

2. The method of claim 1, wherein the capability filter is based on a union of the first wireless device capability information and the second wireless device capability information.

3. The method of claim 1, wherein the first wireless device capability information comprises capability information one of related to and associated with, a first set of parameters, wherein the second wireless device capability information comprises capability information one of related to and associated with, a second set of parameters, and wherein the capability filter is based, at least in part, on the first set of parameters and on the second set of parameters.

4. The method of claim 3, wherein the first set of parameters comprises a first set of frequency bands, and wherein the second set of parameters comprises a second set of frequency bands.

5. The method of claim 3, wherein the capability filter is based on a union of the first set of parameters and of the second set of parameters.

6. The method of claim 1, further comprising:
receiving, from the wireless device, third wireless device capability information, wherein the third wireless device capability information comprise capability information related to the capability filter.

7. The method of claim 6, further comprising:
sending the third wireless device capability information to at least one of another radio network node and a core network node.

8. The method of claim 1, further comprising:
sending, to another wireless device, another request for capability information, wherein the another request for capability information comprises the capability filter based, at least in part, on the first wireless device capability information and on the second wireless device capability information.

9. The method of claim 1, wherein the radio network node is a target radio network node and the network node is a source radio network node.

10. The method of claim 1, wherein the network node is a core network node.

11. A radio network node configured to:
receive, from a network node, first wireless device capability information associated with a wireless device;
determine second wireless device capability information required by the radio network node;
send, to the wireless device, a request for capability information, wherein the request for capability information comprises a capability filter based, at least in part, on the first wireless device capability information and on the second wireless device capability information.

12. The radio network node of claim 11, wherein the capability filter is based on a union of the first wireless device capability information and the second wireless device capability information.

13. The radio network node of claim 11, wherein the first wireless device capability information comprises capability information one of related and associated with, a first set of parameters, wherein the second wireless device capability information comprises capability information one of related to and associated with, a second set of parameters, and wherein the capability filter is based, at least in part, on the first set of parameters and on the second set of parameters.

14. The radio network node of claim 13, wherein the first set of parameters comprises a first set of frequency bands, and wherein the second set of parameters comprises a second set of frequency bands.

15. The radio network node of claim 13, wherein the capability filter is based on a union of the first set of parameters and of the second set of parameters.

16. The radio network node of claim 11, further configured to:
receive, from the wireless device, third wireless device capability information, wherein the third wireless device capability information comprise capability information related to the capability filter.

17. The radio network node of claim 16, further configured to:
send the third wireless device capability information to at least one of another radio network node and a core network node.

18. The radio network node of claim 11, further configured to:
send, to another wireless device, another request for capability information, wherein the another request for capability information comprises the capability filter based, at least in part, on the first wireless device capability information and on the second wireless device capability information.

19. The radio network node of claim 11, wherein the radio network node is a target radio network node and the network node is a source radio network node.

20. The radio network node of claim 11, wherein the network node is a core network node.

21. A non-transitory computer storage medium storing computer-readable instructions, when the computer-readable instructions are executed by processing circuitry of a radio network node, the computer-readable instructions cause the radio network node to:
receive, from a network node, first wireless device capability information associated with a wireless device;
determine second wireless device capability information required by the radio network node; and
send, to the wireless device, a request for capability information, the request for capability information comprising a capability filter based, at least in part, on the first wireless device capability information and on the second wireless device capability information.

* * * * *